United States Patent [19]

Nakazumi et al.

[11] Patent Number: 5,260,132
[45] Date of Patent: Nov. 9, 1993

[54] ACICULAR ALLOY MAGNETIC POWDER

[75] Inventors: Tetuya Nakazumi; Mikio Kishimoto, both of Osaka; Toshinobu Sueyoshi, Kyoto; Seigi Kawarai, Hyogo, all of Japan

[73] Assignee: Hitachi Maxell, Ltd., Ibaraki, Japan

[21] Appl. No.: 701,059

[22] Filed: May 16, 1991

Related U.S. Application Data

[62] Division of Ser. No. 429,642, Oct. 31, 1989, abandoned.

[30] Foreign Application Priority Data

| Oct. 31, 1988 | [JP] | Japan | 63-275827 |
| Feb. 6, 1989 | [JP] | Japan | 1-27263 |
| Mar. 20, 1989 | [JP] | Japan | 1-68754 |
| Apr. 12, 1989 | [JP] | Japan | 1-92437 |
| Apr. 17, 1989 | [JP] | Japan | 1-96697 |

[51] Int. Cl.$^5$ .................... B32B 1/00; G11B 5/00
[52] U.S. Cl. .................... 428/403; 252/62.55; 428/694 BA; 428/900; 148/105; 148/306; 148/307; 148/310; 148/311; 75/348; 75/369; 106/403
[58] Field of Search ............ 252/62.55; 148/306, 148/307, 310, 311, 105; 75/348, 369; 428/403, 694, 900; 106/403

[56] References Cited

U.S. PATENT DOCUMENTS

| 3,679,398 | 7/1972 | Geus | 75/108 |
| 3,855,016 | 12/1974 | Ehrreich et al. | 148/31.57 |
| 3,969,494 | 7/1976 | Nobuoka et al. | 423/633 |
| 4,054,530 | 10/1977 | Deffeyes | 252/62.54 |
| 4,061,824 | 12/1977 | Deffeyes et al. | 428/328 |
| 4,447,264 | 5/1984 | Suzuki et al. | 75/251 |
| 4,654,260 | 3/1987 | Chubachi et al. | 428/328 |
| 4,804,561 | 2/1989 | Tanioka et al. | 427/130 |
| 4,886,703 | 12/1989 | Hasumi et al. | 428/323 |
| 4,888,212 | 12/1989 | Iida et al. | 429/130 |
| 4,895,758 | 1/1990 | Sakemoto et al. | 428/323 |
| 5,151,115 | 9/1992 | Tamai | 75/348 |

FOREIGN PATENT DOCUMENTS

| 63-064306 | 3/1988 | Japan . |
| 63-184307 | 7/1988 | Japan . |
| 63-184308 | 7/1988 | Japan . |

*Primary Examiner*—Stevan A. Resan
*Attorney, Agent, or Firm*—Birch, Stewart, Kolasch & Birch

[57] ABSTRACT

An acicular alloy base magnetic powder comprising iron and cobalt, which has an average particle long axis size of not larger than 0.25 μm, an axial ratio of from 4 to 8, a cobalt content of from 8 to 50% by weight based on the weight of iron and saturation magnetization of at least 120 emu/g after being kept standing at the temperature of 60° C. and relative humidity of 90% for a week, which has improved corrosion resistance and can provide a magnetic recording medium suitable for recording in the short wavelength range.

6 Claims, 1 Drawing Sheet

FIG. 1

FIG. 2

ACICULAR ALLOY MAGNETIC POWDER

This application is a divisional of copending application Ser. No. 07/429,642, filed on Oct. 31, 1989, now abandoned, the entire contents of which are hereby incorporated by reference.

BACKGROUND OF THE INVENTION

1. Field of the Invention

The present invention relates to acicular alloy magnetic powder, a method for producing the magnetic powder and a magnetic recording medium comprising the magnetic powder. More particularly, it relates to acicular fine particle magnetic powder made of an alloy comprising iron and cobalt, a method for producing such fine particle magnetic powder and a magnetic recording medium comprising such fine particle magnetic powder and having improved corrosion resistance.

2. Description of the Related Art

Since metal iron base magnetic powder has larger coercive force and saturation magnetization than iron oxide base magnetic powder and is suitable for high density recording, it is now practical to be used for producing a magnetic recording medium.

Since the particle surfaces of metal iron base magnetic powder are very active and easily corroded, its handling is difficult, and further the magnetic recording medium comprising the metal iron base magnetic powder suffers from decrease of output characteristics under high temperature and high humidity conditions. This is apparent from the fact that the saturation magnetization of the metal iron base magnetic powder greatly decreases in several hours when the magnetic powder is placed in an atmosphere of 60° C. and humidity of 90%.

To improve the corrosion resistance of the metal iron magnetic powder, it is proposed to use an alloy of iron with other metal such as cobalt whereby a passive state film is formed on the particle surface.

Standard methods for producing the alloy base magnetic powder include:

(1) reduction of a co-precipitated material prepared from an iron salt and a cobalt salt which are added to an aqueous solution of oxalic acid;

(2) thermal reduction of iron oxide particles on which surface cobalt is deposited;

(3) addition of a reducing agent to a solution comprising an iron salt and a cobalt salt;

(4) evaporation of metal in an inert gas to cause collision of the evaporated metal with the gas molecules; and (5) reducing iron chloride and cobalt chloride both in vapor states in a mixture of hydrogen with nitrogen or argon to form metals.

In the method (1), control of the composition of the particles is difficult. In the method (2), since the cobalt compound is formed on the iron particles, it is difficult to maintain the acicular form. In the methods (3), (4) and (5), the produced magnetic powder is not acicular but in the form of chained beads and does not have satisfactory orientation.

To overcome the above problems, it is proposed to thermally reduce acicular goethite particles which contain cobalt and are prepared from alkaline aqueous suspensions of the iron salt and the cobalt salt.

Although the alloy base magnetic powder produced by the above method has better corrosion resistance than the conventional metal iron base magnetic powder, the content of cobalt in the powder does not exceed about 7% by weight and at such low cobalt content, satisfactory corrosion resistance cannot be achieved. The reason for this has not been made clear, but may be attributed to insufficient formation of the passive state on the particle surfaces because of shortage of cobalt in the metal magnetic powder.

Then, the present inventors thought that it would be necessary to protect the passive state film or to supply a sufficient amount of cobalt, and performed the following experiments.

To supply the sufficient amount of cobalt in the above method comprising thermally reducing the acicular goethite which contains cobalt, an excess amount of the cobalt salt was added to the aqueous suspension in order to increase the cobalt content in the produced magnetic powder. However, the particle shape or uniformity of the composition were disturbed, that is, the shape of goethite particle was deformed, or particles with irregular shapes were contained in the goethite powder. Therefore, the sufficiently large amount of cobalt cannot be introduced in the metal magnetic powder.

The present inventors investigated causes for such phenomena, and it is found that the problems will not be solved by the conventional methods in which the cobalt salt is added to the suspension during formation of the goethite powder. The reasons for this are as follows:

First, since the iron constituting the goethite is trivalent and is not equal to the valency of cobalt which is divalent, the iron ions and the cobalt ions cannot be freely exchanged. Second, the cobalt concentration in the aqueous suspension may control a growth rate of the goethite crystal. Third, since the shape of goethite particle determines the shape of metal magnetic powder particle through subsequent processing of the goethite powder, it is preferred that the cobalt ions which influence the growth rate of the goethite crystal are not present during the formation of the goethite particles.

SUMMARY OF THE INVENTION

Then, one object of the present invention is to provide a novel acicular iron/cobalt alloy base magnetic powder.

Another object of the present invention is to provide a method for producing such novel acicular iron/cobalt alloy base magnetic powder.

A further object of the present invention is to provide a magnetic recording medium comprising such novel acicular iron/cobalt alloy base magnetic powder.

These and other object of the present invention are achieved by:

providing an acicular alloy base magnetic powder comprising iron and cobalt, which has an average particle long axis size of not larger than 0.25 μm, an axial ratio of from 4 to 8, a cobalt content of from 8 to 50% by weight based on the weight of iron and saturation magnetization of at least 120 emu/g after being kept standing at the temperature of 60° C. and relative humidity of 90% for a week; or providing an acicular alloy base magnetic powder comprising iron and cobalt, which has an average particle long axis size of not larger than 0.25 μm, a cobalt content of from 8 to 50% by weight based on the weight of iron and saturation magnetization of at least 120 emu/g after being kept standing at the temperature of 60° C. and relative humidity of 90% for a week, and particle surfaces of which are covered with a ferrite film comprising iron and cobalt; or providing an acicular alloy base magnetic powder comprising iron and cobalt, which has an average particle long axis size of not larger than 0.25 μm, a cobalt content of from 5 to 50% by weight based on the weight of iron and saturation magnetization of at least 120 emu/g after being kept standing at the temperature of 60° C. and relative humidity of 90% for a week, and particle surfaces of which are covered with a film comprising at least one of silicon and aluminum.

The acicular magnetic powder may further comprise nickel.

DETAILED DESCRIPTION OF THE INVENTION

The present invention has been completed based on the following findings:

Goethite of a uniform particle form is formed and converted to magnetite having divalent iron ions. Then, a part of the divalent iron ions are exchanged with divalent cobalt ions, and cobalt is reacted to form a solid solution of iron and cobalt in which the particles form magnetite, whereby the acicular form of the particles is maintained and the content of cobalt in the solid solution can be increased. Thereafter, the obtained particles are reduced to produce a novel alloy base magnetic powder. The novel alloy base magnetic powder has good acicular form and an average long axis particle size of not larger than 0.25 μm. In addition, the novel alloy base magnetic powder has saturation magnetization of at least 120 emu/g after being kept standing at the temperature of 60° C. and relative humidity of 90% for a week. The reason for this may be that cobalt can be present in the solid solution state although cobalt is contained in an amount at least 8% by weight based on the weight of iron in the magnetic particles.

When the novel alloy base magnetic powder is contained in the magnetic layer of magnetic recording medium, it keeps good corrosion resistance even after being subjected to very severe recording and reproducing conditions. Such good property may be attributed to much higher hardness of the alloy base magnetic particles than the metal iron magnetic particles because of a comparatively large amount of cobalt in the solid solution of iron and cobalt in the particles.

In a preferred embodiment, nickel is present during synthesis of the crystal of iron base particles. Nickel can further improve the corrosion resistance of the alloy base magnetic powder and contribute to the homogeneous formation of solid solution of iron and cobalt.

That is, the iron salt and nickel salt are reacted in an aqueous alkaline solution to form a co-precipitated material of iron hydroxide and nickel hydroxide. Then, the co-precipitated material is oxidized to give iron base particles having a narrow distribution of particle size. In such case, when the amount of nickel is not smaller than 2% by weight based on the weight of iron, the distribution of particle size of the iron base particles can be narrowed. The Ni-containing iron particles are then reduced in a hydrogen atmosphere containing steam to form magnetic iron oxide. Then, cobalt is reacted with the iron base magnetic particles according to the present invention and reduced. Thereby, the obtained alloy base magnetic powder has increased saturation magnetization and corrosion resistance When the amount of nickel is smaller than 2% by weight based on the weight of iron, the distribution of particle size is not narrowed. Therefore, the increase of amount of cobalt to be subsequently added does not necessarily achieve uniform concentration of cobalt in each particle or improvement of corrosion resistance.

In view of the durability of corrosion resistance, nickel is preferably present in a surface layer of each alloy base magnetic particle. In addition, nickel is preferably present in the form of an intermetallic compound of iron and nickel.

To control the particle shape of the alloy base magnetic powder, metal elements other than iron, cobalt and nickel, for example, chromium and manganese may be added. However, a large amount of such other metal elements decreases saturation magnetization. To prevent decrease of saturation magnetization, the total amount of iron and cobalt is not less than 90% by weight based on the total amount of all the metal elements.

To produce the alloy base magnetic powder having high saturation magnetization and corrosion resistance, it is important to form the solid solution of iron, cobalt and optionally nickel in which cobalt elements are homogeneously present in the other metal elements. If the cobalt elements are segregated on the surface of the alloy base magnetic particles, local cells are formed and corrosion is induced. Thereby, high saturation magnetization is not achieved.

To form the solid solution of iron, cobalt and nickel, for example, the Ni-containing iron oxide magnetic powder is suspended in a solution of cobalt chloride in a polyhydric alcohol, the suspension is heated to form the solid solution of cobalt in the iron oxide magnetic particles, and then the magnetic particles are heated and reduced with the hydrogen gas (cf. Japanese Patent Kokai Publication No. 146900/1977).

In the above method, if the distribution of particle size of the iron oxide magnetic particles is broad, the particles have different specific surface areas from each other, so that the rate of the cobalt exchange reaction differs among particles and the particles have different compositions from each other. Thereby, potential difference is formed among the particles so that partial cells are formed and, in turn, the alloy base magnetic particles are corroded. Then, it is understood that the distribution of particle size plays an important role in the production of the magnetic powder having good corrosion resistance. That is, the distribution of particle size of goethite particles has to be narrow by the presence of nickel during the synthesis of the goethite raw material to improve the corrosion resistance of the finally produced alloy base magnetic powder.

In the present invention, the control of the divalent iron ions is important to induce the exchange reaction between the divalent iron ions on the iron oxide magnetic particles and the cobalt ions so as to form the solid solution of iron and cobalt.

The iron oxide which is used as a core crystal has the spinel structure, and the magnetite which has the largest content of $Fe^{2+}$ ($Fe^{2+}/Fe^{3+} = 50\%$ by weight) is represented by the formula: $Fe^{3+}[Fe^{3+}Fe^{2+}]O_4$. Besides, $\gamma$-$Fe_2O_3$ containing no $Fe^{2+}$ is represented by the formula: $Fe^{3+}[Fe^{3+}{}_{5/3}\square_{1/3}]O_4$ in which $\square$ represents a hole. As the content of $Fe^{2+}$ increases, the number of holes decreases. In the reaction of cobalt with the iron oxide in the polyhydric alcohol to form the solid solution, the exchange reaction between the $Fe^{2+}$ ions on the surfaces of magnetic ion oxide particles and the $Co^{2+}$ ions proceeds at the interface between the liquid and the solid, and the $Co^{2+}$ ions trapped on the surfaces diffuse into the inside of the particles through the holes.

Then, to add cobalt to the solid solution effectively in the above method, the amount of $Fe^{2+}$ or holes is controlled.

That is, when $Fe^{2+}/Fe^{3+}$ is in the range between 5 and 45% by weight, the $Fe^{2+}$ ions are replaced with the cobalt ions, and the cobalt ions diffuse into the particle inside. However, when $Fe^{2+}/Fe^{3+}$ is less than 5% by weight, the $Fe^{2+}$ ions cannot be replaced with the cobalt ions, so that the amount of cobalt in the solid solution decreases. When $Fe^{2+}/Fe^{3+}$ is more than 45% by weight, the amount of holes which can contribute to the diffusion of cobalt ions and the $Co^{2+}$ ions diffuse with difficulty into the particle inside, so that cobalt segregates on the particle surfaces, and the amount of cobalt in the solid solution decreases.

One of the general methods for controlling the amount of divalent iron ions in the iron oxide magnetic powder comprises partially reducing the iron oxide magnetic powder in a hydrogen gas at high temperature. However, by such method, it is difficult to adjust the reduction conditions and then to achieve the desired ratio of $Fe^{2+}/Fe^{3+}$. In addition, the iron oxide magnetic particles tend to be sintered together, and the reaction rates of cobalt for the formation of solid solution differ between the sintered parts and the unsintered parts. Therefore, the iron/cobalt alloy base magnetic powder which is produced by reducing the iron oxide magnetic powder containing cobalt in the solid solution has poor erasing properties.

Japanese Patent Kokai Publication No. 90198/1978 discloses control of the content of divalent iron ions in the iron oxide magnetic powder to be used as the raw material by dispersing the iron oxide magnetic powder having the controlled particle shape in the polyhydric alcohol containing the iron salt and heating the dispersion. This method is useful to overcome the above problems.

That is, the amount of divalent iron ions in the magnetic iron oxide which has large influence on the content of cobalt is controlled in the same polyhydric alcohol as that used for the reaction to form the solid solution of iron and cobalt. When the resulting cobalt-containing iron oxide magnetic powder is used as the raw material, the particles are less sintered together during the production of the iron/cobalt alloy particles.

When the magnetic iron oxide powder is dispersed in the polyhydric alcohol in which the iron salt is dissolved and heated, the divalent iron ions are introduced in the magnetic iron oxide particles to form an intermediate iron oxide. The amount of introduced divalent iron ions increases as the temperature rises or as the iron ion concentration increases.

Examples of the polyhydric alcohol are polyethylene glycol, ethylene glycol, propylene glycol and glycerol.

The thermal reduction can be carried out under the known reduction conditions. The reduction temperature is usually from 150° to 500° C.

The conventional acicular magnetic powder has the axial ratio of at least 10 in order to increase the coercive force through shape anisotropy. If the axial ratio of the alloy base magnetic powder comprising iron and cobalt and having the high saturation magnetization is increased to 10 or higher, the coercive force is increased to about 1700 Oe or higher, but such coercive force is too high for the magnetic recording medium. To decrease the coercive force to about 1600 Oe or less, conventionally the particle size is increased. However, the increase of particle size results in the mixture of particles having various particle sizes from small to large and in turn broadening of the particle size distribution. With the magnetic powder having such broadened particle size distribution, an anisotropic magnetic field distribution is broadened although the coercive force is adequate. As the result, the magnetic recording medium comprising such magnetic powder has deteriorated erasing properties. In addition, such a magnetic recording medium generates large noise due to the large particle size of the magnetic powder.

To reduce the coercive force to a level suitable for the magnetic recording medium while keeping the particle size small and the anisotropic magnetic field distribution narrow, the axial ratio of the magnetic powder particle is adjusted in the range between 4 and 8, preferably between 4.5 and 7.0.

When the axial ratio is 4, the coercive force is about 0.78 times that for the axial ratio of larger than 10, and when the axial ratio is 8, the coercive force is about 0.96 times that for the axial ratio of larger than 10. When the axial ratio is less than 4, the control of coercive force is difficult. When the axial ratio is larger than 8, the coercive force is not satisfactorily reduced.

Since the alloy base magnetic powder of the present invention has reduced coercive force due to the small axial ratio, it is not necessary to increase the particle size, and the average particle long axis size is preferably from 0.1 to 0.25 μm.

In any of the alloy base magnetic powder of the present invention, a ratio of the half-width of the anisotropic magnetic field distribution to the coercive force is less than 3.2. This means that the anisotropic magnetic field distribution is narrow. Then, the alloy base magnetic powder of the present invention has improved erasing properties, and the magnetic recording medium comprising such alloy base magnetic powder generates less noise.

The acicular alloy base magnetic powder of the present invention has the saturation magnetization of 120 emu/g or larger and good corrosion resistance after being kept standing at the temperature of 60° C. and relative humidity of 90% for a week. This is partially because of the presence of cobalt in a suitable amount in the alloy base magnetic powder and partially because of the content of nickel in an amount of at least 2% by weight based on the weight of iron.

The magnetic recording medium with good durability of corrosion resistance comprising the alloy base magnetic powder of the present invention can be prepared as follows:

The surfaces of the acicular particles of alloy base magnetic powder are exposed to hot oxygen-containing gas to form ferrite layers on the particles. Alternatively, application of a layer containing at least one of aluminum and silicon on the surfaces of the acicular alloy base magnetic particle imparts corrosion resistance with durability to the magnetic power when the cobalt content is rather small. The aluminum- or silicon-containing layer can be formed by dispersing the magnetic particles in a solution of an aluminum or silicon base compound and adding water to form the aluminum or silicon-containing layer through hydrolysis. The effect of the aluminum- or silicon-containing layer can be optimum when the amount of aluminum or silicon is in a specific range such that the amount of the aluminum and/or silicon atoms is from 1 to 9 atoms/nm$^2$. When the amount of such atoms is less than the lower limit, the corrosion resistance with durability cannot be effectively improved. When the amount of such atoms is larger than the upper limit, an amount of non-magnetic components undesirably increases so that the magnetic properties, particularly the saturation magnetization of the acicular alloy base magnetic powder tends to be deteriorated.

When the magnetic layer functions to protect the alloy base magnetic powder, the corrosion resistance with durability of the magnetic powder is achieved. That is, as described later, such protection can be realized by addition of inorganic powder having the Mohs' hardness of at least 5 as a filler or addition of a lubricant which imparts lubricity to the surface of the magnetic layer (e.g. aliphatic acids, aliphatic acid esters, mineral oils, etc.) or selection of a specific binder which imparts abrasion resistance to the magnetic layer. When the surface of the magnetic layer has such roughness as 0.004 $\mu$m in terms of center line average height, penetration of corrosive gas into the magnetic layer can be prevented and a coefficient of friction can be decreased, whereby formation of flaws on the surface of magnetic layer can be reduced. As a result, the corrosion resistance with durability of the magnetic recording medium can be improved.

When the magnetic recording medium is a magnetic tape, flaws which are generated by contact of the magnetic layer to a back coating when wound tend to deteriorate the corrosion resistance with durability. Therefore, the back coating preferably has a center line average height of 0.01 $\mu$m or less and contains primary particles or aggregates of carbon black which has a particle size larger than the average particle long axis size of the alloy base magnetic powder.

With the above measures, the reliability of the recording medium is maintained by maintaining the corrosion resistance even under severe abrasion and preventing an increase of drop out or noise. In the case of a magnetic tape which comprises the magnetic layer and the back coating, the tape has a total thickness of 14 $\mu$m or less and is used in a wound state.

In general, the magnetic recording medium is produced by applying a magnetic paint on a support film such as a polyester film and drying the magnetic paint to form the magnetic layer. The magnetic paint is prepared by dispersing the magnetic powder, the binder resin, the inorganic powder, the lubricant and the like in an organic solvent. In case of a magnetic recording medium such as a video tape which has the back coating comprising the binder, the inorganic powder and the lubricant to improve traveling property, both the magnetic layer and the back coating contain the inorganic powder having the Mohs' hardness of at least 5 to prevent abrasion caused by contact to a magnetic head or guide rollers.

The addition of the inorganic powder having the Mohs' hardness of at least 5 to the back coating is proposed in Japanese Patent Kokai Publication Nos. 112/1987, 38525/1987, 38526/1987 and 38527/1987, and the addition of such inorganic powder to the magnetic coating is proposed in Japanese Patent Publication Nos. 18572/1972, 15003/1973, 39402/1974, 28642/1977, 49961/1977 and 15771/1980.

To further decrease the noise, the surface of the magnetic layer is treated by super calendering (cf. Japanese Patent Publication Nos. 17404/1977 and 12688/1985).

When the magnetic recording medium is produced by using the acicular alloy base magnetic powder of the present invention, although the initial noise is low, drop out or noise increases after a long traveling time particularly after being stored under the corrosive conditions for a long time, particularly when the cobalt content in the magnetic powder is less than 8% by weight. That is, the drop out of signals having a frequency corresponding to the recording wavelength of 0.8 $\mu$m or less or noise increases after a long traveling time.

This drawback can be overcome by the alloy base magnetic powder having the average particle long axis size of not larger than 0.25 $\mu$m and the axial ratio of 4 to 8, containing cobalt in an amount of 8 to 50% by weight based on the weight of iron, the surface layer of ferrite comprising iron and cobalt and the layer comprising at least one of aluminum and silicon on the particle surfaces. The magnetic recording medium comprising such alloy base magnetic powder keeps initial low noise after storage.

Then, the above drawback may relate to not only the corrosion resistance but also abrasion resistance of the alloy base magnetic powder, and the above phenomenon is often seen in the magnetic tape having the total thickness of 14 $\mu$m or less. One of the reasons for this is that the number of winding of such a thin magnetic tape per unit winding diameter is larger than that of a magnetic tape having a total thickness of about 20 $\mu$m and the tape is wound under large force near a hub. Then, the above drawback is particularly seen in the magnetic recording medium comprising the ferromagnetic alloy powder and having the center recording wavelength of 0.8 $\mu$m or less, while the shortest recording wavelength at the white level is 1.3 $\mu$m in the VHS video tape comprising the support film, the magnetic layer and the back coating with the total thickness of about 20 $\mu$m.

According to the present invention, it has been also found that the susceptibility to flaws on the magnetic layer depends on the particle size of the powder contained in the magnetic layer and that, although the reinforcing effect on the magnetic layer is decreased when the particle size is smaller than a certain size, the increased hardness of powder can maintain the strength of the magnetic layer. Based on these findings, as already described, the present invention proposes (1) the limitation of the cobalt content in the alloy, (2) formation of the passive state films on the particle surfaces and (3) application of the protective layer comprising at least one of aluminum and silicon.

The corrosion resistance of the magnetic layer is influenced by the back coating which seems to have no relation with the magnetic layer. When the magnetic tape is wound, the inorganic powder having the Mohs' hardness of at least 5 creates flaws in the surface of the magnetic layer, whereby the alloy base magnetic powder may be exposed to the corrosive atmosphere. Therefore, preferably, the inorganic powder having the Mohs' hardness of at least 5 contained in the back coating has a particle size smaller than the acicular alloy base magnetic powder.

To improve the traveling property of the magnetic recording medium, the back coating often contains carbon black.

It is known that increase of drop out is suppressed and the traveling property is improved by the use of fine grain carbon black having a particle size of 10 to 30 mμ, coarse grain carbon black having a particle size of 200 to 500 mμ and non-magnetic powder having a particle size of not larger than 0.2 μm (cf. for example, Japanese Patent Kokai Publication No. 8328/1987).

However, none of the prior art suggests a relationship between the particle size of primary particle or agglomerate of carbon black and the average particle long axis size of the ferromagnetic alloy powder in the magnetic layer. In addition, none of the prior art discloses the relationship between the noise against the signal frequency corresponding to recording wavelength of not longer than 0.8 μm and the major particle size when the acicular alloy base magnetic powder has a small average particle long axis size.

During the development of the present invention, the relationship between the particle size of primary particles or agglomerate of carbon black and the average particle long axis size of the ferromagnetic alloy powder in the magnetic layer was studied to find that when the particle size of primary particles or agglomerate of carbon black is larger than the average particle long axis size of the ferromagnetic alloy powder, the high output and low noise are achieved.

The above particle size relationship is important to satisfy the requirement for high density recording, particularly in the magnetic recording medium comprising the magnetic layer with a thickness of about 3.0 μm or less.

To provide the magnetic recording medium which comprises the magnetic layer and the back coating on the respective surfaces of the support film, achieving high output and suppressing the noise as much as possible in the high density recording with the center recording wavelength of 0.8 μm or less, it is preferred that the magnetic layer has a squareness ratio of at least 0.85 measured at the applied magnetic field of 10 KOe, the magnetic layer has the coercive force of at least 1500 Oe, the surface of magnetic layer has the smoothness of 0.004 μm in terms of the center line average height, the surface of the back coating has the smoothness of 0.01 μm or less in terms of the center line average height, and the particle size of inorganic powder having the Mohs' hardness of at least 5 is smaller than the average particle long axis size of the alloy base magnetic powder.

Since carbon black is rather soft in general, it could not be expected that carbon black in the back coating would cause flaws in the surface of the magnetic layer. To achieve the high density recording with the center recording wavelength of 0.8 μm or less, the average particle long axis size of magnetic particles is made 0.2 μm or less and the magnetic layer comprising the metal magnetic powder has insufficient reinforcing strength. In addition, the thin recording tape required for the high density recording is wound many times which generates strong winding force. Therefore, the small particles of carbon black tend to cause flaws in the surface of the magnetic layer. In such a case, when the back coating contains carbon black having the particle size of primary particles or agglomerate of carbon black which is larger than the average particle long axis size of the ferromagnetic alloy powder, the small particles are present in spaces among the large ones so that the small particles do not appear on the surface of the back coating. Preferably, the inorganic powder having the Mohs' hardness of at least 5 has the particle size smaller than the average particle long axis size of acicular alloy base magnetic powder. When the magnetic tape having the above construction is wound around the hub made of, for example, polyoxymethylene resin with the back coating facing inside, the wound tape is preferably stored in a cassette casing made of ABS resin containing a pigment having the Mohs' hardness of 2 to 4.

In the present invention, the non-magnetic support film may be any one of conventionally used resin films. Examples of the resins are polyesters (e.g. polyethylene terephthalate, polyethylene 2,6-naphthalate, etc.), polyolefins (e.g. polyethylene, polypropylene, etc.), cellulose derivatives (e.g. cellulose triacetate, cellulose diacetate, etc.), vinyl resins (e.g. polyvinyl chloride, polyvinylidene chloride, etc.), polycarbonates, polyimides, polyamides, and the like. Among them, preferred are biaxial orientation type polyesters such as polyethylene terephthalate or polyethylene 2,6-naphthalate having modulus in the longitudinal direction of at least 700 kg/mm$^2$ and in the widthwise direction of at least 400 kg/mm$^2$ and surface roughness of 0.01 μm in terms of center line average height.

On one surface of the support film, the magnetic paint comprising the organic solvent, the magnetic powder, the inorganic powder having the Mohs' hardness of at least 5 and the binder resin as well as other optional additives are applied in a desired thickness and dried while being subjected to the magnetic field orientating treatment to form the magnetic layer.

In general, the average particle long axis size of the alloy base magnetic powder is 0.8 μm or less in view of the relationship with the center recording wavelength, and preferably 0.25 μm or less in view of resolving power.

In case of the alloy base magnetic powder containing nickel and cobalt, when the alloy composition is adjusted so that the nickel content is at least 2% by weight and the cobalt content is at least 110% by weight based on the weight of nickel, the saturation magnetization of the magnetic powder can be kept at not less than 120 emu/g after being kept standing at the temperature of 60° C. and relative humidity of 90% for one week. In view of erasing properties, the ratio of the half-width of the anisotropic magnetic field distribution to the coercive force is preferably less than 3.2.

Examples of the inorganic powder having the Mohs' hardness of at least 5 are metal oxides, metal carbides, metal nitrides, etc. Among them, $\alpha$-Fe$_2$O$_3$ (6), Al$_2$O$_3$ (9), Cr$_2$O$_3$ (9), SiO$_2$ (6), TiO$_2$ (6), ZrO$_2$ (6), SiC (9), TiC (9), hBN (9) and Si$_3$N$_4$ (9) are more preferred, wherein the values in the parentheses indicate the Mohs' hardness of the respective inorganic materials. The organic powder having various particle sizes can be commercially available.

Examples of carbon black to be contained in the back coating are channel black, furnace black, acetylene black, thermal black, etc. Among them, acetylene black is preferred. The graphited carbon black, namely carbon black coated with graphite may be used (cf. Japanese Patent Kokai Publication No. 22424/1986).

Commercially available carbon black are Black Pearl 700 (particle size of 18 mμ), Mogal L (particle size of 20 mμ), ELFTEX pellets-115 (particle size of 27 mμ), Regal 3001 (particle size of 27 mμ), Vulcan XC-72 (particle size of 30 mμ), Sterling NS and R (particle size of 75 mμ) (manufactured by Cabott); Laben 8000 (particle size of 13 mμ), Laben 5250 (particle size of 20 mμ), Laben 450 (particle size of 62 mμ), Laben 410 (particle size of 70 mμ), Laben MT-P beads (particle size of 280 mμ), Laben Sebacalb MT-CI (particle size of 300 mμ) (manufactured by Columbian Carbon); HS-500 (particle size of 75 mμ), #60H (particle size of 35 mμ) (manufactured by Asahi Carbon); Seest 5H (particle size of 20 mμ) (manufactured by Tokai Carbon); Ketchen Black EC (manufactured by Akzo); and #4040 (particle size of 20 mμ), #4330BS (particle size of 23 mμ), #4350BS (particle size of 45 mμ), #4010 (particle size of 80 mμ) (manufactured by Mitsubishi Chemical).

As above, the carbon blacks with various particle sizes are commercially available and selected according to the relationship with the average particle long axis size of the alloy base magnetic powder according to the present invention. When the carbon black has the comparatively small particle size, it is preferred to form an agglomerate consisting of the primary particles by using the structure forming ability of the carbon black. The agglomerate of carbon black particles acts as a single particle.

The inorganic powder and the carbon black are added to the magnetic paint or the back coating paint in such amounts that the above particle size relationships are fulfilled.

Examples of the binder resin to be contained in the magnetic layer or the back coating are vinyl resins (e.g. vinyl chloride-vinyl acetate copolymer, vinyl chloride-vinyl acetate-vinyl alcohol copolymer, vinyl chloride-acrylate copolymer, vinyl chloride-vinylidene chloride copolymer, vinyl chloride-acrylonitrile copolymer, vinyl chloride-vinyl acetate-maleic acid copolymer, etc.), thermoplastic polyurethane resins, thermosetting polyurethane resins, polyester resins, phenoxy resins, polyvinyl butyral resins, cellulose derivatives, epoxy resins, and mixtures thereof. In these resins, hydrophilic groups such as those derived from carboxylic acids, sulfonic acids, sulfonate salts, phosphoric acid, phosphoric salts, amines, ammonium salts, etc7 can be introduced so as to improve dispersibility of the powder particles. Further, an acrylic double bond is introduced in the molecule to cure the resin through radiation of electron beams.

Examples of the solvent to be used in the preparation of the magnetic paint and the back coating paint are alcohols (e.g. ethanol, propanol, butanol, etc.), esters (e.g. methyl acetate, ethyl acetate, butyl acetate, etc.), ketones (e.g. methyl ethyl ketone, methyl isobutyl ketone, cyclohexanone, etc.), ethers (e.g. tetrahydrofuran, dioxane, etc.), aromatic hydrocarbons (e.g. benzene, toluene, xylene, etc.), aliphatic hydrocarbons (e.g. heptane, hexane, cyclohexane, etc.) and chlorinated hydrocarbons (e.g. methylene chloride, ethylene chloride, chloroform, etc.) as well as mixtures thereof. Among them, a mixed solvent of cyclohexanone and toluene is preferred.

The paints may contain a lubricant such as saturated or unsaturated higher fatty acids, higher fatty acid amides, fatty acid esters, higher alcohols, silicone oils, mineral oils, food oils, fluorine-containing oils, etc.

The above components in desired amounts are dispersed in a ball mill or a sand mill to prepare the magnetic paint or the back coating paint which is then applied on the surface of non-magnetic support film.

The mixture of the components should be carefully dispersed so as not to apply excessive force to the inorganic powder or carbon black. Otherwise, the particle size of carbon black would be changed.

For the application of paints, the magnetic paint is firstly coated on one surface of the support film, subjected to magnetic field orientation and then dried followed by surface smoothing treatment. After winding the support film having only the coated magnetic layer, the back coating paint is coated on the other surface of the support film while unwinding the support film. These steps are described in detail in Japanese Patent Publication No. 23647/1983. Alternatively, the magnetic layer and the back coating can be formed simultaneously.

Each of the magnetic layer and the back coating is formed by one application of the paint or plural applications of the paint.

The support film having the magnetic layer and the back coating is cut with a slitting apparatus to form a tape with a desired width. Then, the tape is wound around a hub with the back coating inside and set in a cassette casing.

When the total thickness of the magnetic layer, the support film and the back coating is not larger than 14 μm, the modulus in the longitudinal direction is larger than that in the widthwise direction but not larger than twice the modulus in the widthwise direction. In addition, the modulus in the longitudinal direction is at least 1000 kg/mm$^2$.

The magnetic layer has hardness such that when the tape is traveled for 23 meters while pressing a steel ball of 6 mm in diameter under load of 5 grams, the volume decrease of the steel ball is not larger than $20 \times 10^{-5}$ mm$^3$. When the magnetic layer has such hardness, it is not flawed by reciprocally sliding a sapphire blade having a vertical angle of 45° on the magnetic layer under load of 50 g/3.81 mm width for 1000 times.

The above relationship between the moduluses in the longitudinal and widthwise directions is achieved by selecting the suitable support material and/or mechanical control of the magnetic particles through magnetic field orientation. The modulus of 1000 kg/mm$^2$ or larger in the longitudinal direction is achieved by selecting the curing conditions of the binder resins in the magnetic layer and the back coating.

To regulate the volume decrease of the steel ball with the magnetic layer to $20 \times 10^{-5}$ mm$^3$ or less, the amount of the inorganic powder having the Mohs' hardness of at least 5, the conditions for smoothing the surface and the drying conditions of the paints are adequately adjusted.

Since a strong winding force is applied to the hub during winding of the tape a depth of a sink mark on the peripheral surface of the hub on which the tape is wound should be less than 5 μm in order to prevent curling of the tape.

Since the back coating side of the tape contacts the tape guides of the cassette casing, at least the tape guide parts are preferably made of the ABS resin to decrease the noise. To prevent the flaws of the back coating, the pigment having the Mohs' hardness of 2 to 4 such as calcium carbonate and barium sulfate is added to the resin from which the tape guides are made. To prevent the electrostatic noise, the resin for making the cassette casing preferably contains an antistatic agent such as carbon black and a quaternary ammonium salt (e.g. polyoxyethylene alkylamine) and a fluidizing agent for the molten resin such as ethylene-bis-stearoamide. The cassette casing can be produced by melting the resin containing the above additives and injection molding the molten resin in a mold.

PREFERRED EMBODIMENTS OF THE INVENTION

The present invention will be explained further in detail by the following examples in which "parts" are be weight unless otherwise indicated.

I. Preparation of alloy base magnetic powder

To a 5 mol/l aqueous solution of sodium hydroxide (1.5 l), an aqueous solution of ferrous sulfate (0.72 mol/l) and nickel sulfate (A mol/l, see below Table 1) (1.5 l) was added at room temperature while stirring to co-precipitate ferrous hydroxide and nickel hydroxide. In the suspension of co-precipitated material, air was bubbled at a flow rate of 1.6 l/min. at 40° C. for 8 hours while stirring. The resulting mixture was filtered, washed with water and dried to obtain acicular goethite particles having the average particle long axis size of 0.22 μm and the axial ratio of 7. The particle shape varied with the concentration of the alkaline solution and the metal salts, and the acicular ratio (G) could be changed by slightly changing these concentrations (see Table 1). The goethite particles (100 g) were dispersed in water (3 liters). To the suspension, a 1 mol/l aqueous solution of sodium hydroxide (2 liters) and a 1 mol/l aqueous solution of sodium orthosilicate (26 ml) were added followed by blowing carbon dioxide gas until the pH of the suspension reached 8. The particles were washed with water and dried to coat the particle surfaces with a silicate compound.

Then, the iron oxide particles coated with the silicate compound were dispersed in water (3 liters). To the suspension, a 1 mol/l aqueous solution of sodium hydroxide (2 liters) and a 0.5 mol/l solution of sodium aluminate (135 ml) were added followed by blowing carbon dioxide gas until the pH reached 8. The particles were washed with water and dried to coat the particle surfaces with alumina. Then, the goethite particles coated with the silicate compound and alumina were sintered at 750° C. for 4 hours and then reduced in a hydrogen stream containing water vapor at 300° C. for 8 hours to obtain magnetic iron oxide powder. The $Fe^{2+}/Fe^{3+}$ ratio in the iron oxide was adjusted by one of the following ways:

(B-i) The magnetic iron oxide powder (20 g) was heated and partially oxidized in an oxygen-containing atmosphere to adjust the $Fe^{2+}/Fe^{3+}$ ratio at D % (see Table 1).

(B-ii) In a solution of ferrous chloride tetrahydrate (C g, see Table 1) in ethylene glycol (300 g), the iron oxide powder (40 g) was dispersed and heated at 180° C. for 4 hours while stirring to adjust said ratio at D %, followed by washing with water and drying.

In a solution of cobalt chloride hexahydrate (see Table 1) in polyethylene glycol (300 ml), the magnetic iron oxide having the controlled $Fe^{2+}/Fe^{3+}$ ratio (20 g) was dispersed and heated at 200° C. for 6 hours while stirring to form the magnetic iron oxide powder in which cobalt was homogeneously present in the form of a solid solution. After washing with water, the magnetic powder was reduced in a hydrogen atmosphere at 450° C. for 2 hours and then gradually oxidized at 60° C. for 2 hours with the flow of an inert gas (nitrogen, helium or argon) containing 1000 ppm of oxygen to obtain the acicular alloy base magnetic powder having the average particle long axis size of 0.2 μm and a ferrite layer comprising iron and cobalt on the particle surfaces.

The surfaces of acicular alloy base magnetic particles were treated as follows (F):

To the suspension of acicular alloy base magnetic powder (100 g) in ethanol (2 liters), $Si(OC_2H_5)_4$ (7.5 g) was added. After heating the mixture to 60° C., water (7.8 g) was dropwise added to hydrolyze $Si(OC_2H_5)_4$ to form a layer of the hydroxide of silicon in an amount of 7 Si atoms/nm$^2$ on the particles surfaces of the acicular alloy base magnetic powder.

The above process conditions A through G employed in the production of Sample Nos. 1 through 14 are summarized in Table 1.

TABLE 1

| Sample No. | Nickel sulfate A mol/l | $Fe^{2+}/Fe^{3+}$ adjustment method B | Ferrous chloride C g | $Fe^{2+}/Fe^{3+}$ D wt % | Cobalt chloride E g | Surface treatment F | Axial ratio G |
|---|---|---|---|---|---|---|---|
| 1 | 0.03 | (i) | — | 20 | 25 | Yes | 7 |
| 2 | 0.03 | (i) | — | 20 | 30 | Yes | 7 |
| 3 | 0.03 | (i) | — | 20 | 21 | Yes | 7 |
| 4 | 0.03 | (i) | — | 20 | 10 | No | 7 |
| 5 | 0.02 | (i) | — | 20 | 25 | Yes | 7 |
| 6 | 0 | (i) | — | 20 | 25 | Yes | 7 |
| 7 | 0.03 | (i) | — | 15 | 25 | Yes | 7 |
| 8 | 0.03 | (i) | — | 25 | 25 | Yes | 7 |
| 9 | 0.03 | (i) | — | 3 | 25 | Yes | 7 |
| 10 | 0.03 | (i) | — | 46 | 25 | Yes | 7 |
| 11 | 0.03 | (ii) | 4.0 | 20 | 25 | Yes | 7 |
| 12 | 0.03 | (ii) | 0.2 | 2 | 25 | Yes | 7 |
| 13 | 0.03 | (i) | — | 20 | 25 | Yes | 10 |
| 14 | 0.03 | (i) | — | 20 | 10 | Yes | 7 |

II. Formation of magnetic layer

The acicular alloy base magnetic powder prepared in the above (100 parts), hydroxyl group-containing polyvinyl chloride base resin having a polymerization degree of 340 (10 parts), thermoplastic polyurethane resin (7 parts), alumina having the particle size of 0.2 μm (8 parts), myristic acid (2 parts), red oxide ($\alpha$-$Fe_2O_3$) having the particle size of 0.8 μm (2 parts) and carbon black (one part of #4010 manufactured by Mitsubishi Chemical having the particle size of 20 mμ and 2 parts of Seest 5H manufactured by Tokai Carbon having the particle size of 20 mμ) were kneaded with the mixed solvent of cyclohexanone (70 parts) and toluene (70 parts) in a ball mill for 96 hours. To the mixture, a trifunctional polyisocyanate compound (5 parts) was added and mixed to prepare a magnetic paint. The magnetic paint was coated on one surface of a biaxially orientated polyethylene terephthalate film having the thickness of 10 μm in the dry thickness of 2.5 μm and dried followed by calendering to form the magnetic layer.

III. Formation of back coating

Carbon black (60 parts of Seest 5H manufactured by Tokai Carbon having the particle size of 20 μm and 7.5 parts of Laben MT-P beads manufactured by Columbian Carbon having the particle size of 280 mμ), calcium carbonate having the particle size of 0.05 μm (30 parts), red oxide having the particle size of 0.1 μm (2.5 parts), thermoplastic polyurethane resin (45 parts), nitrocellulose (40 parts) and a trifunctional isocyanate compound (15 parts) as a cross linking agent were kneaded with the mixed solvent of cyclohexanone (330 parts) and toluene (330 parts) in a ball mill for 96 hours to prepare a back coating paint. The back coating paint was coated on the other surface of the polyethylene terephthalate film having the magnetic layer on one surface in the dry thickness of 1.0 μm and dried followed by curing at 60° C. for 20 minutes.

The total thickness of the coated film was 13.5 μm.

The coated film was cut to obtain a magnetic tape having the desired width and wound around a hub made by injection molding of polyoxymethylene resin with the back coating layer side inside. The peripheral surface of the hub on which the tape is wound had sink marks of less than 0.1 μm in depth.

IV. Production of cassette casing

An ABS resin (NA-1060 manufactured by Denkikagaku Industries) (100 parts), a colorant consisting of carbon black treated with ferrocyanine blue (23 parts), calcium carbonate having the particle size of 0.5 μm (35 parts), polyoxyethylene alkylamine (12 parts) and ethylene-bis-stearoamide (3 parts) were kneaded in a Henschel mixer at 110° C. for one minute and extruded with a twin-screw extruder at 220° C. to produce pellets. Then, the pellets were melt together with the same ABS resin (1500 parts) in a furnace at 240° C. and injection molded at a molding temperature of 30° C. to produce a cassette casing.

In the cassette casing, the tape wound around the hub was set to assemble a cassette tape.

All the cassette tapes had the squareness ratio of at least 0.85 measured in the applied magnetic field of 10 KOe. The center line average height of each of the magnetic layer and the back coating was measured with a tracer type surface roughness tester with using a tracer having R of 2 μm at a cut off of 0.08 mm. The magnetic layer and the back coating had the center line average heights of 0.004 μm and 0.01 μm, respectively.

The ratios of cobalt, nickel, aluminum and silicon to iron, namely Co/Fe, Ni/Fe, Al/Fe and Si/Fe (all in wt %) in the magnetic powder of each of Sample Nos. 1 through 14 were measured by the fluorescent X-ray spectroscopy, and the axial ratios were measured by a transmission type electron microscope. With a sample vibration type magnetometer, coercive force (Oe), saturation magnetization (emu/g), saturation magnetization after being kept standing at the temperature of 60° C. and relative humidity of 90% for one week (emu/g), and the anisotropic magnetic field distribution were measured. The anisotropic magnetic field distribution is expressed in terms of the ratio of the half-width of the anisotropic magnetic field distribution to the coercive force. The results are shown in Table 2.

TABLE 2

| Sample No. | Co/Fe (wt %) | Ni/Fe (wt %) | Al/Fe (wt %) | Si/Fe (wt %) | Axial ratio | Coercive force (Oe) | Saturation magnetization (emu/g) | Saturation magnetization after one week (emu/g) | Anisotropic magnetic field distribution |
|---|---|---|---|---|---|---|---|---|---|
| 1 | 21.0 | 4.2 | 3.5 | 1.6 | 7.0 | 1550 | 158.0 | 137.5 | 2.3 |
| 2 | 25.0 | 4.4 | 3.6 | 1.6 | 7.0 | 1590 | 161.1 | 145.1 | 2.5 |
| 3 | 17.3 | 4.0 | 3.6 | 1.5 | 7.0 | 1501 | 156.2 | 138.0 | 2.3 |
| 4 | 8.1 | 4.1 | 3.4 | 0.6 | 7.0 | 1500 | 151.0 | 110.0 | 2.4 |
| 5 | 20.3 | 3.0 | 3.6 | 1.5 | 7.0 | 1500 | 157.3 | 137.9 | 2.6 |
| 6 | 20.9 | 0.0 | 3.5 | 1.5 | 7.0 | 1420 | 160.9 | 105.0 | 3.3 |
| 7 | 18.2 | 4.1 | 3.5 | 1.6 | 7.0 | 1513 | 156.5 | 138.2 | 2.3 |
| 8 | 26.3 | 4.0 | 3.5 | 1.5 | 7.0 | 1591 | 161.0 | 143.3 | 2.3 |
| 9 | 6.0 | 4.2 | 3.6 | 1.5 | 7.0 | 1314 | 140.0 | 125.5 | 2.5 |
| 10 | 5.2 | 4.1 | 3.6 | 1.6 | 7.0 | 1298 | 139.8 | 123.3 | 2.5 |
| 11 | 20.0 | 4.2 | 3.5 | 1.5 | 7.0 | 1541 | 156.1 | 136.8 | 2.3 |
| 12 | 5.9 | 4.1 | 3.5 | 1.5 | 7.0 | 1300 | 138.9 | 124.1 | 2.6 |
| 13 | 21.0 | 4.1 | 3.5 | 1.6 | 9.0 | 1753 | 157.8 | 136.2 | 2.8 |
| 14 | 8.1 | 4.1 | 3.4 | 1.5 | 7.0 | 1527 | 150.0 | 131.8 | 2.5 |

With the magnetic recording media produced with using each of Sample Nos. 1 through 8 and 14, the decrease (%) of saturation magnetic flux density after being kept standing at the temperature of 60° C. and relative humidity of 90% for one week was measured. Also, the magnetic tape slit to the width of 3.81 mm was abraded by reciprocally sliding a sapphire blade having a vertical angle of 45° on the magnetic layer under the load of 50 g/3.81 mm width for 1000 times and immediately kept standing at the temperature of 60° C. and relative humidity of 90% for one week. Thereafter, the decrease of saturation magnetic flux density was measured with the VSM.

Signals of 7 MHz was recorded on the magnetic tape and the noise level at 6 MHz during reproducing was measured just after being wound around the hub, or after slitting the tape to the width of 3.81 mm, abrading the slit tape by reciprocally sliding a sapphire blade having a vertical angle of 45° on the magnetic layer under the load of 50 g/3.81 mm width for 1000 times and immediately being kept standing at the temperature of 60° C. and relative humidity of 90% for one week. The noise level after abrading and being kept standing at the temperature of 60° C. and relative humidity of 90% for one week was compared with the noise level just after being wound around the hub (0 dB).

The results are shown in Table 3.

TABLE 3

| Sample No. | Decrease of saturation magnetic flux density after abrasion (%) | Decrease of saturation magnetization density after abrasion and kept standing for one week (%) | Noise level change (dB) |
|---|---|---|---|
| 1 | −2.0 | −2.0 | 0.1 |
| 2 | −2.0 | −2.0 | 0.1 |
| 3 | −2.5 | −2.6 | 0.1 |
| 4 | −12.0 | −14.1 | 2.0 |
| 5 | −2.2 | −2.3 | 0.2 |

TABLE 3-continued

| Sample No. | Decrease of saturation magnetic flux density after abrasion (%) | Decrease of saturation magnetization density after abrasion and kept standing for one week (%) | Noise level change (dB) |
| --- | --- | --- | --- |
| 6 | −11.3 | −14.4 | 2.3 |
| 7 | −2.0 | −2.3 | 0.2 |
| 8 | −2.0 | −2.1 | 0.1 |
| 14 | −3.8 | −4.0 | 0.2 |

Figure 1:
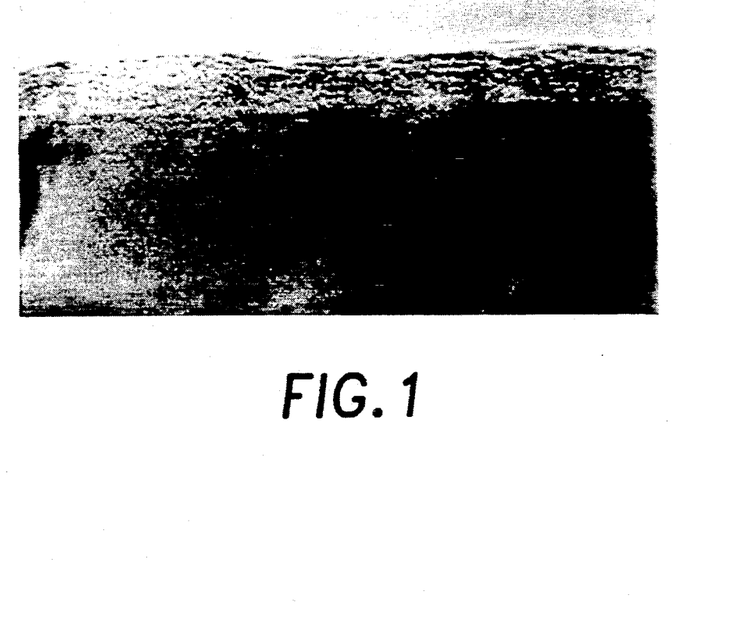
FIGS. 1 and 2 are electron microscopic photographs of Sample Nos. 1 and 10, respectively.
Figure 2:
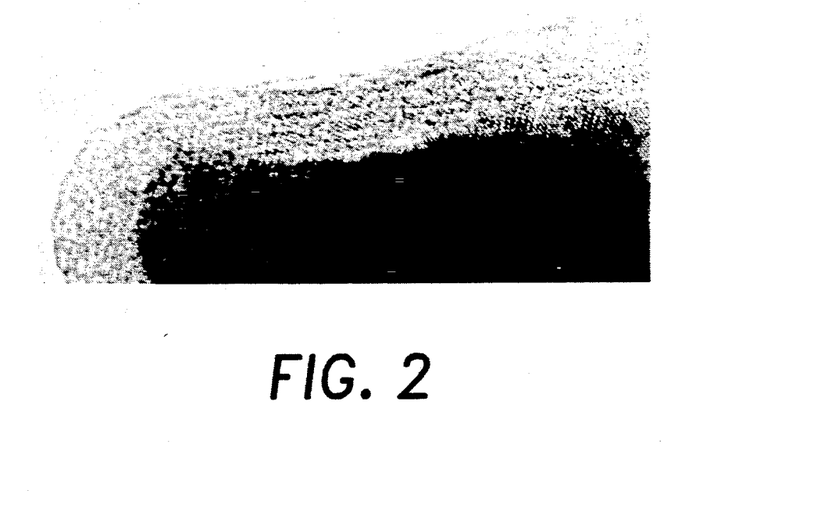

With the magnetic powder of Sample Nos. 1 and 10, the particle surfaces were observed with the transmission type electron microscope. The thickness of the ferrite layer was 28 Å for Sample No. 1 and 35 Å for Sample No. 10. The electron microscopic photographs of Sample Nos. 1 and 10 are shown in FIGS. 1 and 2, respectively.

From the above results, it is understood that the acicular alloy base magnetic powder of the present invention has large saturation magnetization and good corrosion resistance, and also the magnetic recording medium comprising such magnetic powder has improved corrosion resistance and corrosion resistance with durability. The noise level is not increased after the test for corrosion resistance with durabililty.

Therefore, the magnetic recording medium comprising the acicular alloy base magnetic powder of the present invention is suitable for recording in the short wavelength range.

What is claimed is:

1. Acicular alloy base magnetic powder particles comprising nickel, iron and cobalt having an average particle long axis size of not larger than 0.20 μm, such that a ratio of a half-width of an anisotropic magnetic field distribution to a coercive force is not larger than 3.2, an axial ratio of from 4 to 8, a cobalt content of from 5 to 50% by weight based on the weight of iron, a nickel content in an amount of at least 2% by weight based on the weight of iron and a saturation magnetization of at least 120 emu/g after being kept standing at a temperature of 60° C. and relative humidity of 90% for a week, particle surfaces of which are covered with a ferrite film comprising iron and cobalt and further including a film comprising at lest one of aluminum and silicon.

2. The acicular alloy base magnetic powder according to claim 1, wherein the ferrite film has a thickness of 5 to 30 Å.

3. The acicular alloy base magnetic powder according to claim 1, wherein the content of cobalt is from 10 to 30% by weight based on the weight of iron.

4. The acicular alloy base magnetic powder particles according to claim 1, wherein nickel is locally present in surface parts of said alloy particles.

5. The acicular alloy base magnetic powder particles according to claim 1, wherein nickel is present in said alloy particles in the form of a solid solution of iron and nickel.

6. The acicular alloy base magnetic powder according to claim 1, wherein a coated amount of at least one of silicon and aluminum is from 1 to 9 atoms/nm$^2$.

* * * * *